A. H. HARRIS.
COUPLING.
APPLICATION FILED OCT. 10, 1908.

935,624.

Patented Sept. 28, 1909.

Witnesses
C. H. Griesbauer

Inventor
Adolphus H. Harris
By H. B. Willson & Co
Attorneys

UNITED STATES PATENT OFFICE.

ADOLPHUS H. HARRIS, OF DENVER, COLORADO.

COUPLING.

935,624.  Specification of Letters Patent.  Patented Sept. 28, 1909.

Application filed October 10, 1908. Serial No. 457,099.

*To all whom it may concern:*

Be it known that I, ADOLPHUS H. HARRIS, a citizen of the United States, residing at Denver, in the county of Denver and State of Colorado, have invented certain new and useful Improvements in Couplings; and I do declare the following to be a full, clear, and exact description of the invention, such as will enable others skilled in the art to which it appertains to make and use the same.

My invention relates to coupling devices, and especially to that type which are utilized for joining the pipe sections of air-brake systems for steam railroads.

The object of the invention is to provide a simple and efficient coupling which will immediately upon separation of the cars cut off all air to the joint, and upon the coupling of the cars will immediately connect all brake mechanisms with the air compressor or reservoir.

With these and other objects in view, the invention consists of certain novel features of construction, combination and arrangement of parts, as will be more fully described and particularly pointed out in the appended claims.

Figure 1:
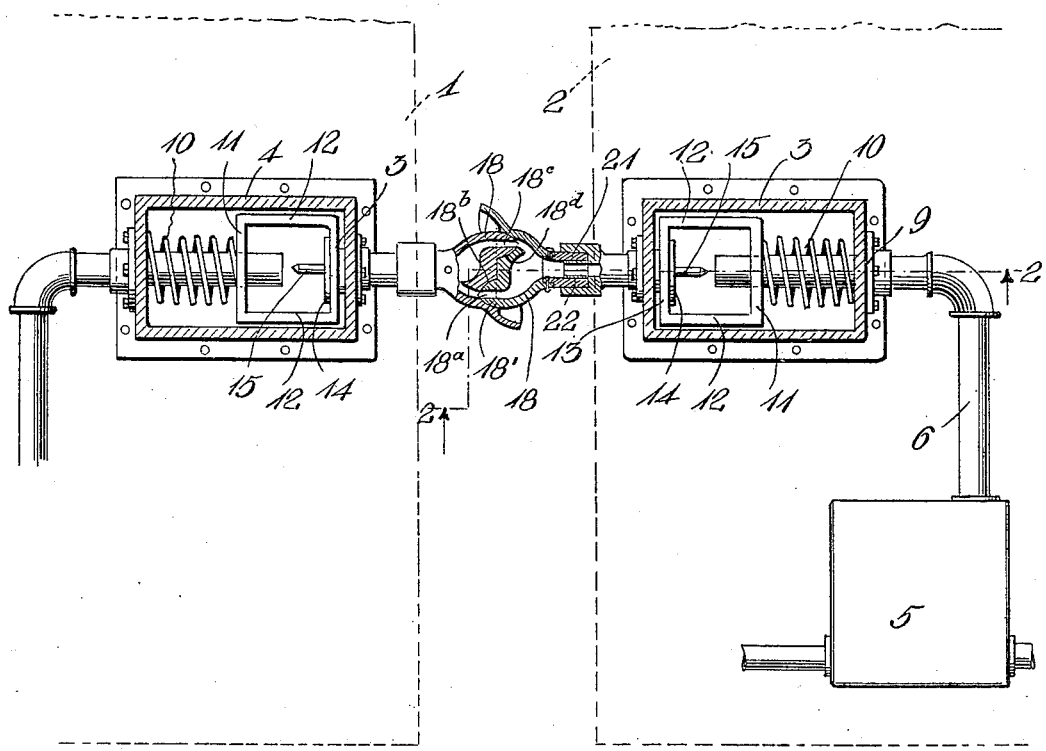
Figure 2:
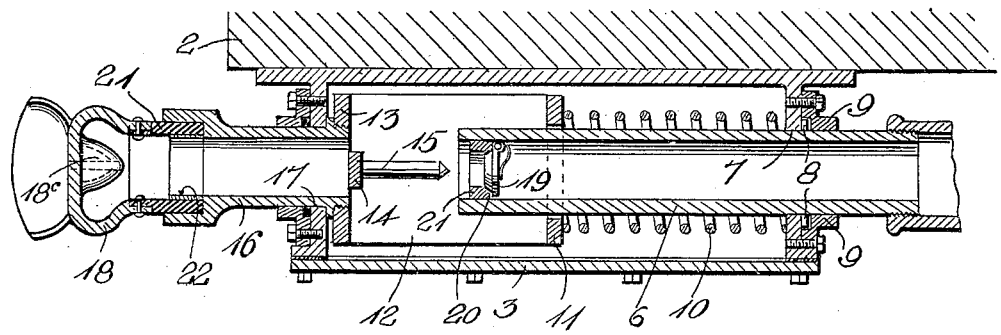

In the accompanying drawings, Figure 1 is a fragmentary top plan view of the ends of two adjoining cars, the cars being shown in light dotted lines, Fig. 2 is a horizontal section through one of the couplers on the line 2—2 of Fig. 1.

Referring more especially to the drawings 1 and 2 represent two adjoining car bodies which are coupled together in the usual manner by couplers which have been omitted for purposes of clearness. Mounted upon the under side of the car bodies 2 are suitable casings 3 and 4, in which the valve mechanism is contained and controlled, as will be hereinafter described. Any number of reservoirs may be used to hold the compressed air, but in this instance I have shown only one, which is numbered 5, and has a discharge pipe 6 leading therefrom to the inlet aperture 7, in the casing 4. This opening is suitably bushed, as shown and the pipe is prevented from movement with respect to the casing by transverse pins or studs 8, which are held in place by a recessed collar 9. The pipe 6 after entering the casing is surrounded by a compression spring 10, whose inner end abuts against a bridge piece 11, carried upon the outer end of the arms 12. These arms are connected at their forward end by a connecting head 13, and a plate 14, which carries the valve operating pin 15. Connected to the head 13 is the outlet pipe 16, which passes through the aperture 17, in the opposite end of the casing, and is provided with the usual coupling head 18. Pivoted in the discharge end of the inlet pipe 6 is a flap valve 19, which seats against the shoulder 20, formed by securing a ring 21 therein or in any suitable manner. The coupling head 18 which is used is shown to have a projecting nipple 18′, having an aperture $18^a$, therethrough. This nipple engages a socket $18^d$, formed in the coupling on the opposite car, and a similar nipple $18^c$ on the opposite coupling engages the socket $18^d$ on the first mentioned coupling 18. The inner portion of this coupling head has secured to it, as shown, a flexible tube 21, which is secured within the annular end of the tie 16 by an expanded ring 22. In practice, this tube is preferably made of heavy hose such as is used in air-pipe couplings, and is considerably longer than what is shown in the drawings so as to permit considerable lateral play. As both of the cases 3 and 4 contain similar mechanism it is thought unnecessary to describe the connections of the mechanism in the casing 4.

In operation, the valve 19 is normally closed by the pressure of the fluid thereagainst from the reservoir 5. Upon the coupling of two cars, however, the pin 15 with its associated arms 12 and bridge 11 is carried backward against the tension of the spring 10, and the pin 15 engages the flap valve 19 and forces it from its seat to permit the air from the reservoir to pass from the inlet pipe 6 to the outlet pipe 16, through the coupling heads 18, and into the opposite casing 4, and from there to the brake mechanism. As the action in the opposite casing 4 is the same, and the action in all other cars similar, it will be seen that only one air compressor and one reservoir may be used and an entire train supplied with the air therefrom. When the cars are uncoupled the back pressure in the pipes is cut off and prevented from escaping as before the coupling heads 18 are parted, the valve 19 is already closed.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. A device of the class described comprising a casing, an inlet pipe leading thereto, a valve within the casing, means surrounding the inlet pipe adapted to operate said valve, and means for returning said operating means to normal position.

2. In a device of the class described, the combination with a casing, of an inlet pipe leading thereto, a valve controlling fluid from said inlet pipe, an outlet pipe, means reciprocating upon the inlet pipe for operating the valve so as to permit fluid to be conducted to the outlet pipe, and means for returning said reciprocating means to normal position.

3. In a device of the class described, a casing, an inlet pipe leading thereinto, a valve in the inlet pipe, an outlet pipe, and means carried by the outlet pipe for operating said valve to permit communication between said inlet and said outlet pipes.

4. In a device of the class described, the combination with a casing, of an inlet pipe leading thereinto, a valve carried by said inlet pipe for controlling the fluid therefrom, an outlet pipe, means carried by said outlet pipe for guiding the reciprocating inlet pipe, means carried by the outlet pipe for operating said valve, and means carried by the inlet pipe for returning said outlet pipe to normal position.

In testimony whereof I have hereunto set my hand in presence of two subscribing witnesses.

ADOLPHUS H. HARRIS.

Witnesses:
E. EDMONSTON, Jr.,
N. G. TUCKER.